US006371265B1

(12) United States Patent
Arrouy et al.

(10) Patent No.: US 6,371,265 B1
(45) Date of Patent: Apr. 16, 2002

(54) ELECTRIC RAILWAY VEHICLE AND AN ELECTRIC POWERING UNIT IN PARTICULAR FOR SUCH A VEHICLE

(75) Inventors: Jean-Marie Arrouy, Bours; Alain Gibert, Aubertin; Jean Paillol, Billere; Victor Sabate, Ezanville, all of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/720,618

(22) PCT Filed: Jun. 28, 1999

(86) PCT No.: PCT/FR99/01553

§ 371 Date: Feb. 22, 2001

§ 102(e) Date: Feb. 22, 2001

(87) PCT Pub. No.: WO00/00991

PCT Pub. Date: Jan. 6, 2000

(30) Foreign Application Priority Data

Jun. 29, 1998 (FR) .......................................... 98 08207

(51) Int. Cl.⁷ .................................................. B60L 1/00
(52) U.S. Cl. ............................ 191/2; 323/208; 323/205
(58) Field of Search .................... 191/2, 8, 50; 323/205, 323/208, 209, 222, 233, 290, 356; 318/434, 139; 336/90, 96; 363/39, 41, 44, 124, 123

(56) References Cited

U.S. PATENT DOCUMENTS

| 3,656,022 | A | | 4/1972 | Greenwood |
| 3,748,618 | A | * | 7/1973 | Kaiserswerth et al. ...... 336/178 |
| 3,781,740 | A | * | 12/1973 | Kirmis et al. .................. 336/96 |
| 4,394,724 | A | * | 7/1983 | Fry et al. ..................... 363/124 |
| 4,984,146 | A | * | 1/1991 | Black et al. ................... 363/44 |
| 5,103,147 | A | * | 4/1992 | Samann ....................... 318/139 |
| 5,610,381 | A | | 3/1997 | Mizufune et al. |
| 5,811,948 | A | * | 9/1998 | Sato et al. ................... 318/434 |

FOREIGN PATENT DOCUMENTS

GB        1 187 410          4/1970

OTHER PUBLICATIONS

Patent Abstracts of Japan, vol. 013, No. 317 (E–789) Jul. 19, 1989 corresponding to JP 01 086425 A (Toshiba Corp) dated Mar. 31, 1989.

* cited by examiner

Primary Examiner—Mark T. Le
(74) Attorney, Agent, or Firm—Sughrue Mion, PLLC

(57) ABSTRACT

An electrical power supply unit powers a load, in particular a transformer (8), from a power source (10) via electrical switchgear (14), in particular a circuit-breaker, and it includes an interference attenuator (16) of the ferrite type for attenuating interference due to switching. The attenuator (16) is placed between the power source (10) and the electrical switchgear (14), thereby contributing to reducing the extent of the interference significantly.

7 Claims, 5 Drawing Sheets

ELECTRIC RAILWAY VEHICLE AND AN ELECTRIC POWERING UNIT IN PARTICULAR FOR SUCH A VEHICLE

BACKGROUND OF THE INVENTION

The present invention relates to an electric rail vehicle provided with an electrical power supply unit.

It is common practice for such an electric vehicle, which may be a locomotive or a motor car or coach, to be powered via a catenary delivering an AC working voltage.

The invention relates more particularly to such a vehicle that is equipped with a load, such as a transformer, and with an electrical power supply unit for electrically powering said load from the catenary. The power supply unit conventionally includes electrical switchgear, such as a circuit-breaker, that protects the high-voltage AC circuits of the rail vehicle.

However, such a configuration suffers from certain drawbacks. Currents appear whose gradients as a function of time are very steep. By way of example, when the AC normal working voltage is 25 kV at 50 Hz, currents of 300 A are generated in about 5 ns. They give rise to interference that can damage, or, at the least, hinder proper operation of equipment situated in the vicinity-of the electrical switchgear, e.g. such as on-board control electronics.

In order to mitigate those drawbacks, an object of the invention is to provide an electric rail vehicle equipped with an electrical power supply unit that gives rise to low electromagnetic interference only, so as to guarantee that no damage is done to the structural integrity of the various items of electrical and electronic equipment with which the vehicle is provided.

SUMMARY OF THE INVENTION

To this end, the invention provides an electric rail vehicle, in particular an electric locomotive, designed to be powered via a catenary, said vehicle including a load, in particular a transformer, and an electrical power supply unit for powering said load from said catenary, via electrical switchgear, in particular a circuit-breaker, said vehicle being characterized in that said power supply unit includes an interference attenuator of the ferrite type for attenuating interference due to switching.

According to an advantageous characteristic of the invention, said interference attenuator is placed between said catenary and said electrical switchgear.

The interference attenuator of the ferrite type for attenuating interference due to switching is known, for example, from JP-A-1 086 425 and JP-A-4 322 024. In those documents, such an attenuator is constituted by a cylinder made of ferrite and disposed around an electrical line situated downstream from the electrical switchgear. The ferrite cylinder behaves as an inductor whose inductance increases with increasing current frequency.

Because of the presence of metal members disposed in the vicinity of the conductor connecting the catenary to the circuit-breaker, stray capacitance forms in the vicinity of the roof of the rail vehicle and upstream from the switchgear. A transmission line constituting an electromagnetic waveguide is created between said upstream stray capacitance and the switchgear proper.

On closing the switchgear, when a voltage is applied across the two electrodes of said switchgear, an electric arc strikes in it. Under certain circumstances, in particular when the switching of the electrical switchgear is based on vacuum "bottle" switching, said electric arc is extremely unstable, i.e. it is subjected to multiple interruptions followed by corresponding re-strikes. Such arc instability corresponds to successive breaks and re-makes that generate electromagnetic interference resulting in steep current gradients which can damage or hinder proper operation of equipment situated in the vicinity of the electrical switchgear.

Because of the frequency, current, and voltage to which the electric rail vehicle is subjected, the interference attenuator of the ferrite type for attenuating interference due to switching is used for its resistive portion, rather than for its inductive portion as in the above-mentioned Japanese patent applications. By providing such an interference attenuator, it is possible to reduce the steep current gradients DI/DT generated on circuit-breaker closure, in particular when the attenuator is placed upstream from the switchgear. Rather than modifying the current oscillations, this contributes to preventing them from forming by reducing the value DI/DT, which is what can generate such oscillations.

In the invention, instead of seeking to filter out a steep current gradient DI/DT initiated previously by the switchgear, the switchgear is forced to switch less rapidly, by influencing the physical establishing of the arc under a vacuum in the "bottle".

The invention also provides an electrical power supply unit, in particular for an electric rail vehicle, for powering a load, in particular a transformer, from a power source via electrical switchgear, in particular a circuit-breaker, said power supply unit including an interference attenuator of the ferrite type for attenuating interference due to switching, said power supply unit being characterized in that said interference attenuator is placed between said power source and said electrical switchgear.

BRIEF DESCRIPTION OF THE DRAWINGS

The invention is described below with reference to the accompanying drawings which are given merely by way of non-limiting example, and in which.

DETAILED DESCRIPTION OF THE INVENTION

Figure 1:
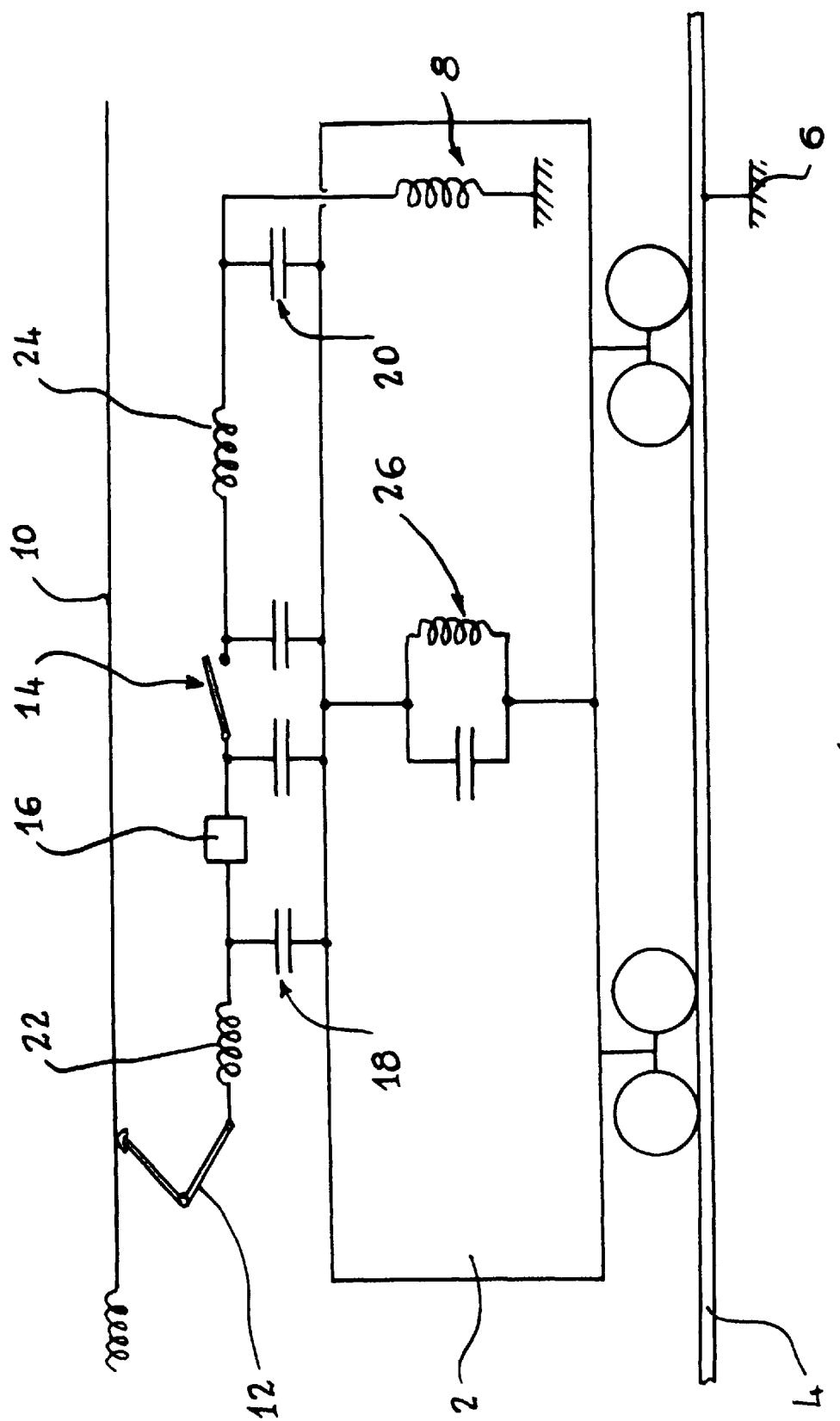
FIG. 1 is a summary diagram of an electric rail vehicle of the invention, as provided with an electrical power supply unit.

FIG. 1 shows an electric rail vehicle, namely a locomotive given overall reference 2, and suitable for running on rails 4 connected to ground 6.

This locomotive 2 is provided with an on-board transformer 8 powered by means of a catenary 10 via a pantograph 12. The catenary 10 constitutes a power source, while the transformer is connected to the motor (not shown) of the locomotive.

Electrical switchgear, constituted by a circuit-breaker 14, and an interference attenuator 16 for attenuating interference due to switching and that is described in more detail below are interposed between the catenary 10 and the transformer 8. The circuit-breaker is a vacuum "bottle" circuit-breaker that constitutes switchgear for coupling and protecting the high-voltage AC circuits of the locomotive. The attenuator 16 is disposed between the catenary 10 and the circuit-breaker 14, i.e. it is placed upstream from said circuit-breaker.

The electrical circuitry on the roof of the locomotive 2, namely, in particular the electrical lines interconnecting the roof equipment of the locomotive is the location where stray capacitance and stray inductance occur, constituting RLC-type circuits that can be excited when the circuit-breaker switches.

The stray capacitance is represented diagrammatically in FIG. 1 by equivalent capacitors, namely an upstream equivalent capacitor 18 and a downstream equivalent capacitor 20, the terms "upstream" and "downstream" being used with reference to the circuit-breaker 14.

The stray inductance is represented diagrammatically in FIG. 1 by connection chokes, namely an upstream choke 22 and a downstream choke 24, also with reference to the circuit-breaker 14.

By interposing the attenuator 16, it is possible, with the roof of the locomotive, to form a transmission line between the upstream capacitor 18 and the circuit-breaker 14 at the working frequencies of the locomotive. This transmission line defers the transfer of charges between the capacitor 18 and the circuit-breaker 14, which reduces the amount of charge available for vacuum discharge, and reduces the gradient of the current as a function of time.

The body of the locomotive is represented by an equivalent LC circuit designated by reference 26 in FIG. 1, which circuit represents the resonance of the metal structure of the locomotive.

Figure 2:
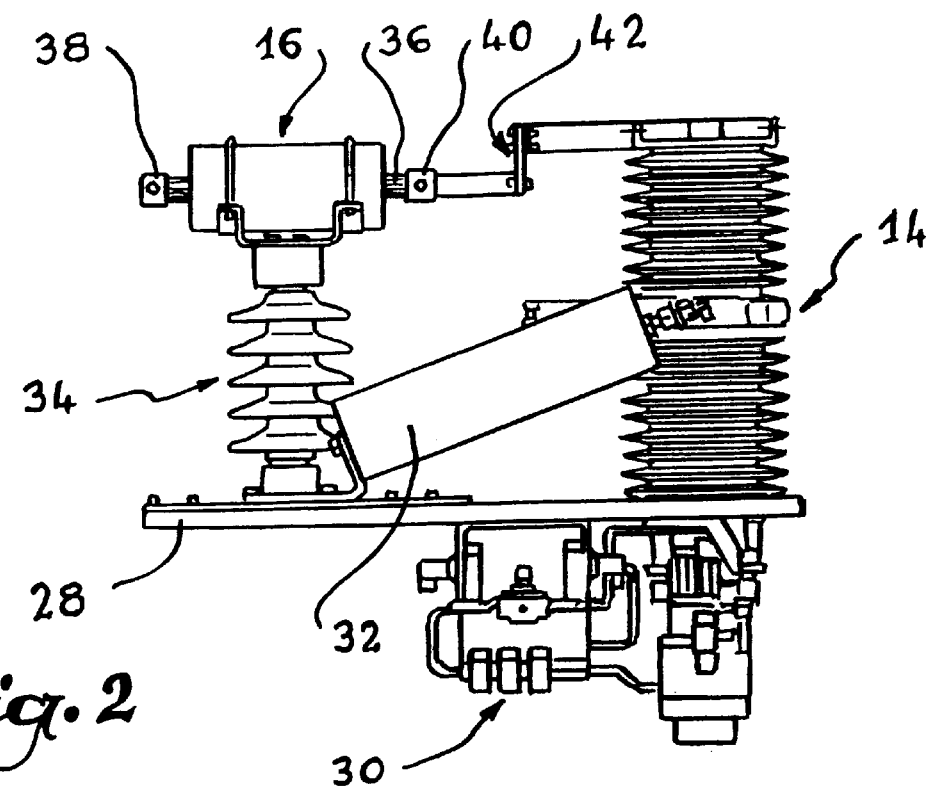
FIG. 2 is a side view showing, in more detail, certain elements of the electrical power supply unit of FIG. 1.

FIG. 2 shows the circuit-breaker 14 in more detail. For example the circuit-breaker is as sold by ALSTOM TRANSPORT under reference ACB 25–10.

The circuit-breaker is disposed in known manner on the roof of the locomotive 2.

It stands on a base plate 28 and it is controlled via a relay stage 20. A lightning arrester 32, extending from the support plate 28, is connected to the circuit-breaker 14. These elements are conventional.

The interference attenuator 16 is mounted on an insulator 34 which itself stands on the plate 28. The attenuator 16 is formed around a conductor element 36 which, in this example, is constituted by a copper tube having two connections, namely an upstream connection 38 and a downstream connection 40. The upstream connection 38 is connected via means (not shown) to the catenary 10, while the downstream terminal 40 is put in connection with the circuit-breaker 14 via an electrical connection 42 of the electrical braid type.

As shown more particularly in FIG. 4, the interference attenuator 16 is made up of a plurality of annular ferrite elements 44, 46 which are described in more detail below. The assembly of these elements 44, 46 is received in an insulating cylindrical housing 48 that is substantially closed at its two ends and that is made of glass fiber, resin, or epoxy.

Figure 3:
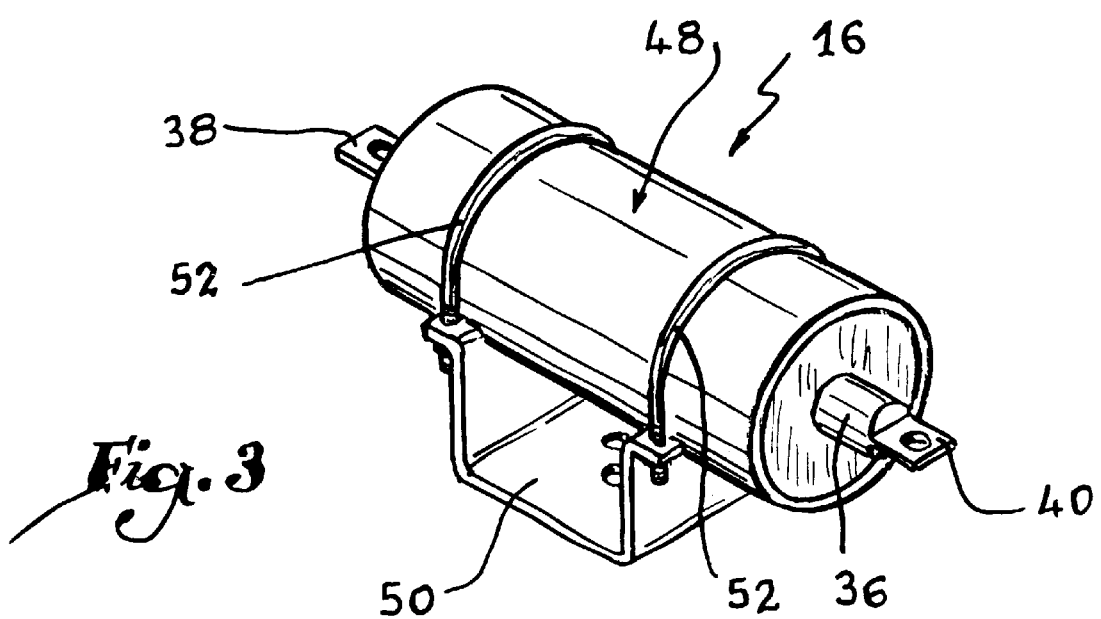
FIG. 3 is a perspective view of an attenuator for attenuating interference due to switching, which attenuator is part of the electrical power supply unit of FIGS. 1 and 2.

The housing 48 is fixed to a channel-section base 50 via two hoops 52 (see FIG. 3). The base 50 is itself secured to the top of the insulator 34.

Figure 4:
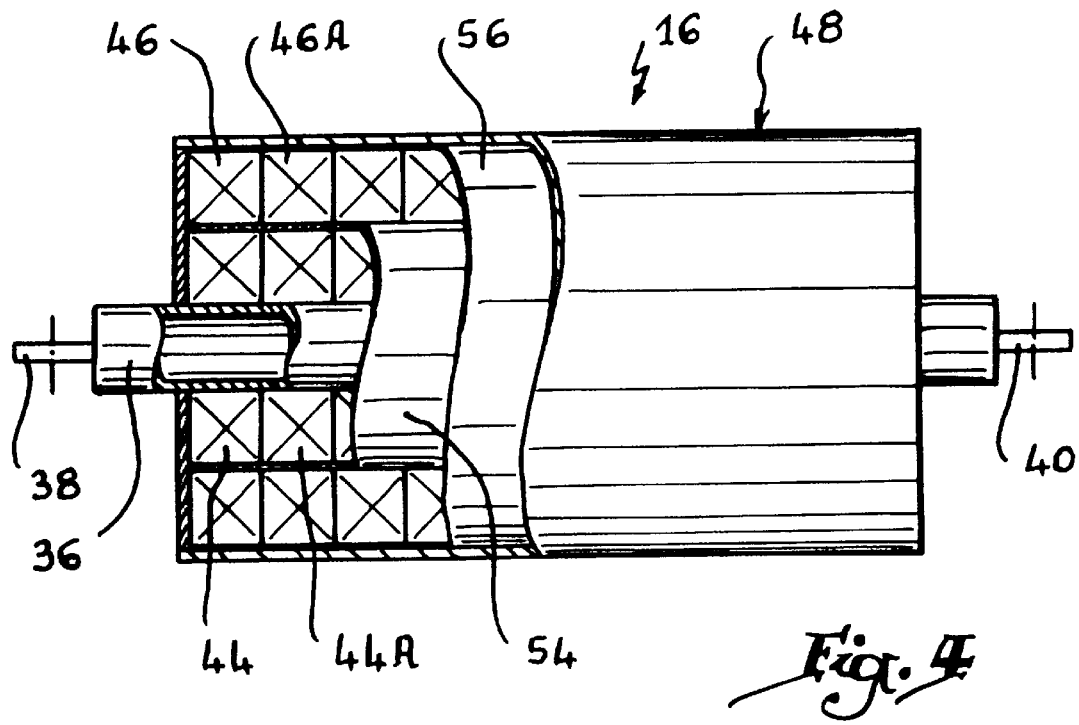
FIG. 4 is a view partially in longitudinal section of the interference attenuator shown in FIG. 3.

As shown more precisely in FIG. 4, the ferrite elements are disposed in pairs that are stacked up axially along the copper tube 36. Each pair of ferrite elements is formed of a low-frequency element 44 disposed at the outside periphery of the copper tube 36, and of a high-frequency annular element 46 whose inside periphery is disposed in the vicinity of the low-frequency element 44.

The housing 48 contains ten pairs of low-frequency and high-frequency ferrite elements, only the pairs of elements 44 & 46 and 44A & 46A being referenced in FIG. 4.

The concept of high-frequency and low-frequency ferrites is explained below. Usually, a ferrite element is characterized by its relative permeabilities, namely its real permeability $\mu'$ and its imaginary permeability $\mu''$. $\mu''$ increases with increasing frequency to reach a maximum at a "cutoff" frequency which, by convention, is referenced $f_c$, and thereafter it decreases considerably. In the present description, the ferrite elements 44 and 44A are referred to as being "low-frequency" because their cutoff frequency is lower than the cutoff frequency of the "high-frequency" ferrite elements 46 and 46A. For example, the cutoff frequency of the high-frequency ferrite elements may lie in the range 5 MHz to 20 MHz, while the cutoff frequency of the low-frequency elements may lie in the range 0.5 MHz to 5 MHz.

For example, a low-frequency ferrite element is sold by Thomson CSF-LCC under the reference B1-T-63000A, while a high-frequency ferrite element is sold by Philips Components under the reference T107/65/253F4.

A mechanically-protective sheet 54 is interposed between the facing surfaces of the low-frequency and high-frequency ferrite elements 44, 46. For example, such a sheet is made of polyurethane-type resin and is sold by LVA under the reference DAMIVAL 13518AW00. Another sheet 56 that is similar to sheet 54 is interposed between the outside periphery of the high-frequency element 46 and the housing 48.

The invention makes it possible to achieve the above-mentioned objects.

By providing an interference attenuator of the ferrite type for the electrical power supply unit that equips a rail vehicle, it is possible to achieve a significant reduction in the interference to which the various items of electrical and electronic equipment of the rail vehicle are subjected. This reduction is particularly significant when the interference attenuator is placed upstream from the electrical switchgear.

Figure 5:
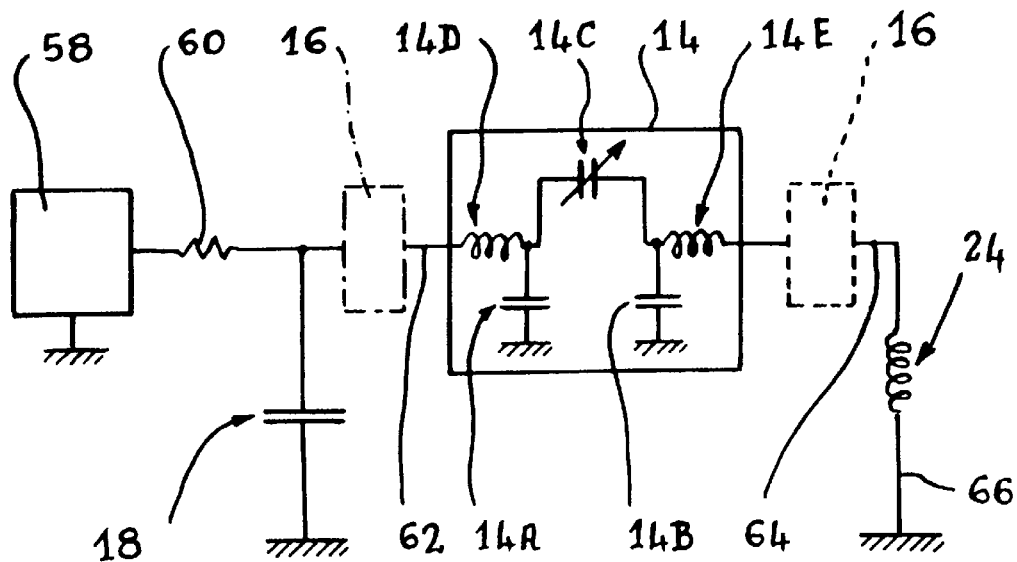
FIG. 5 is a diagram of a laboratory experimental simulation of the electrical switchgear of FIG. 1, and of its electrical environment.

FIG. 5 is a diagram of an experimental circuit implemented in the laboratory and that reproduces in simplified manner the phenomena occurring on the roof of the locomotive 2 of FIG. 1.

The circuit-breaker 14 chosen for this experimentation was used in its industrial configuration. The equivalent electrical circuit diagram of this circuit-breaker was made up firstly of two stray-capacitance capacitors, namely an upstream capacitor 14A and a downstream capacitor 14B, the capacitors having capacitance respectively of 40 pF and of 60 pF, and secondly of an inter-electrode capacitor 14C of variable capacitance, and of two connection chokes 14D and 14E whose inductance was 0.4 $\mu$H.

The circuit-breaker 14 was powered by means of a DC power source 58 under a voltage of 20 kV at most and 1 mA. A load resistor 60 whose resistance was equal to 10 M$\Omega$ was interposed between the source 38 and the circuit-breaker 14. The experimental circuit diagram of FIG. 5 also reproduces the equivalent upstream capacitor 18 whose capacitance was 2 nF, and the downstream choke 24, whose inductance was 25 µH.

At 62, the voltage immediately upstream from the circuit-breaker 14 was measured, which voltage is referred to below as the "upstream voltage". At 64 the voltage downstream from the circuit breaker or "downstream voltage" was also measured. Finally, downstream from the choke 24, the current was measured at 66.

Once the capacitor 18 was charged, the circuit-breaker 14 was closed. The experiment was performed initially in the absence of any attenuator for attenuating interference due to switching, and the corresponding results are given in FIG. 6. Then the experiment was implemented with the circuit-breaker 14 being associated with an interference attenuator 16 as described with reference to FIGS. 3 and 4. The results corresponding to the attenuator 16 being placed downstream from the circuit-breaker 14, as shown in dashed lines in FIG. 5, are given in FIG. 7. FIG. 8 corresponds to the results of the experiment as conducted with an interference attenuator being placed upstream from the circuit-breaker 14, namely in accordance with the invention, as shown in chain-dotted lines in FIG. 5.

Figure 6:
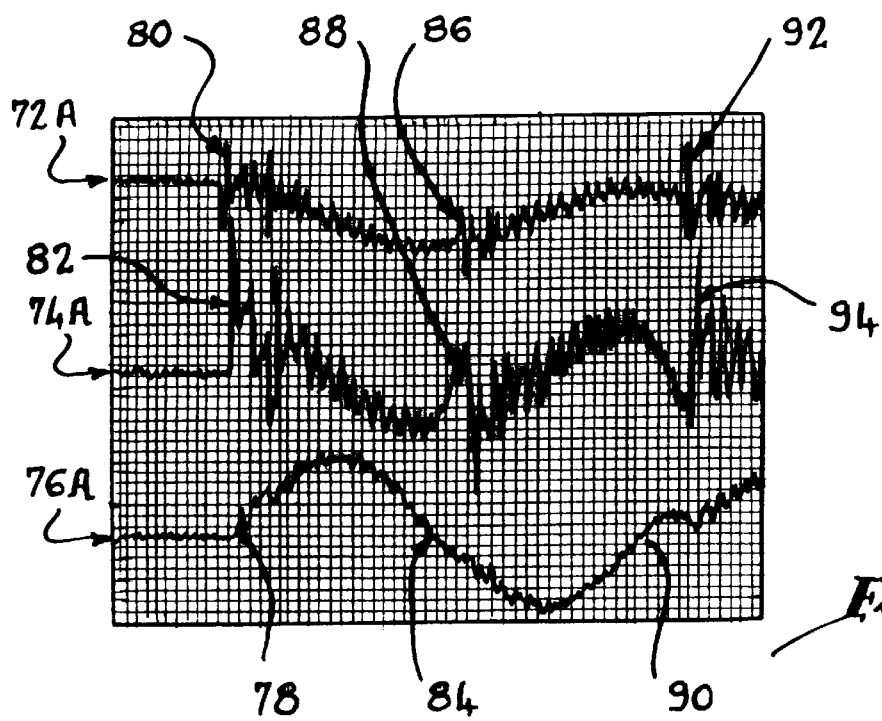
FIGS. 6, 7, and 8 show oscillograms of the upstream voltage, of the downstream voltage, and of the current relating to the electrical switchgear simulated in FIG. 5, respectively as not provided with an interference attenuator, as provided with such an attenuator placed downstream from the electrical switchgear, and as provided with such an attenuator placed upstream therefrom.
Figure 7:
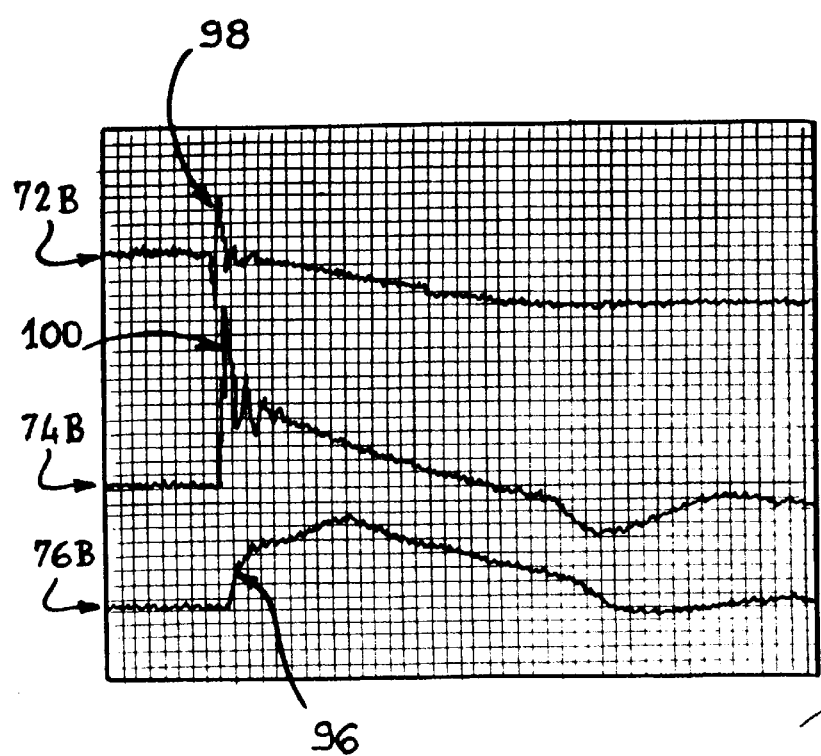
Figure 8:
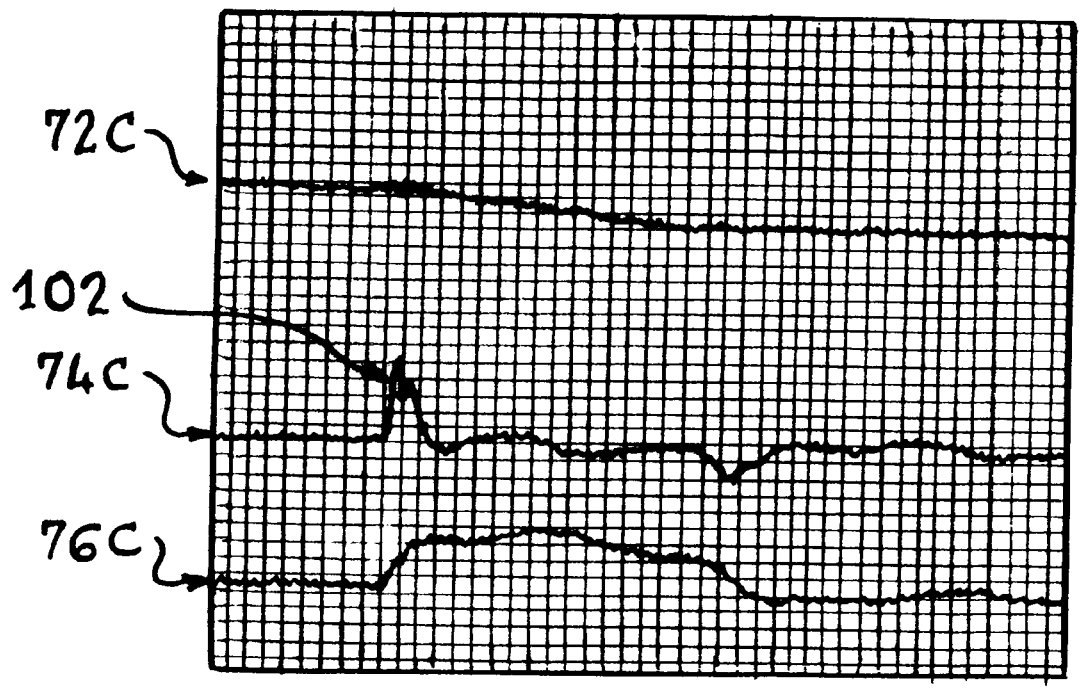

In all three of FIGS. 6 to 8, time is plotted along the x-axis on a scale of 20 ns per square. Starting from the top downwards, the y-axis gives the upstream voltage, referenced respectively 72A, 72B, and 72C in FIGS. 6, 7, and 8, then the downstream voltage, represented respectively by the references 74A, 74B, and 74C in FIGS. 6, 7, and 8, and finally the current in the circuit-breaker, represented respectively by the references 76A, 76B, and 76C in FIGS. 6, 7, and 8.

The scale of the upstream voltages 72 is 2,000 volts per square, the scale of the downstream voltages 74 is 1,000 volts per square, and the scale of the currents 76 is 4 A per square.

With reference to FIG. 6, it can be observed that the current 76 is initially zero prior to switching, it then increases at 78 under the effect of circuit-breaker closure which causes an unstable arc to strike. As a result, corresponding rising edges 80 and 82 are formed respectively in the upstream voltage 72A and in the downstream voltage 74A. Then, while having a very uneven profile, the current increases and then decreases again to zero at 84. This causes major variations, at 86 and 88, in the upstream voltage 72A and in the downstream voltage 74A, these variations being related to the successive interruption and re-striking of the arc.

The current 76A then describes a sinewave related to the resonance of the LC circuit 18, 24 of FIG. 5, and it then goes back, at 90, to its initial value of zero, thereby causing two additional variations, at 92 and 94, in the upstream voltage 72A and in the downstream voltage 74A.

With reference to FIG. 7, it can be observed that the current 76B has a profile that is more even than the profile 76A of FIG. 6. However, significant variations in the current over time can be observed. In particular, at 96, there is a strong increase in current due to circuit-breaker closure. This results in the rising edges 98 and 100 in the upstream voltage 72B and in the downstream voltage 74B. There are thus major current and voltage gradients which give rise to interference for the on-board electronics.

With reference to FIG. 8, which corresponds to the interference attenuator 16 being provided upstream from the circuit-breaker 14, the current 76C has a profile that is significantly more even than the profile 76B obtained by placing the attenuator 16 downstream from the circuit-breaker 14. Only the rising edge 102 relating to the downstream voltage 74C remains significant.

By comparing FIGS. 6, 7, 8, it can be seen that, by using the interference attenuator 16, it is possible to obtain current 76, upstream voltage 72 and downstream voltage 74 that are significantly more even than those obtained without such an attenuator 16, in particular when the attenuator 16 is disposed upstream from the circuit-breaker 14. This is particularly advantageous because it makes it possible to limit the resonance effects of the roof circuits and of the locomotive.

The use of a plurality of ferrite elements is also advantageous. The ferrites become saturated as the current increases. The use of a plurality of ferrite elements whose permeabilities $\mu''$ add together, makes it possible to impart satisfactory effectiveness to the interference suppressor that is equipped with them, even for high current.

It is also advantageous to distribute the ferrite elements in pairs, each of which is made up of elements whose cutoff frequencies are different. This makes it possible to achieve optimum scanning of all of the frequencies generated on circuit-breaker closure. As the frequency increases, it is firstly the low-frequency ferrite element that is effective, and then the high-frequency ferrite element takes over for higher frequencies.

The use of annular ferrite elements that are fitted into one another makes the interference suppressor highly compact as a whole. Providing the high-frequency element at the outside periphery of the low-frequency element is advantageous insofar as the high-frequency element becomes saturated for relatively low current, while the low-frequency element experiences such saturation for higher currents. In such a configuration, the high-frequency element is placed remote from the central conductor so that it is subjected to lower magnetic fields that result in it being saturated only to a lesser extent.

The above description is given with reference to a locomotive, but the invention is also applicable to any electric rail vehicle, such as, for example, a motor car or coach or a railcar.

What is claimed is:

1. An electrical power supply unit in an electric rail vehicle, for powering a load which includes a transformer (8), from a power source (10) via electrical switchgear (14) which includes a circuit-breaker, said electrical power supply unit including a ferrite interference attenuator (16) for attenuating interference due to switching, wherein said ferrite interference attenuator (16) is placed between said power source (10) and said electrical switchgear (14).

2. An electric rail vehicle operative to be powered via a catenary (10), said vehicle comprising a load which includes a transformer (8), and an electrical power supply unit for powering said load from the catenary (10), via electrical switchgear (14) which includes a circuit-breaker, wherein said electrical power supply unit includes a ferrite interference attenuator (16) for attenuating interference due to switching, wherein said ferrite interference attenuator (16) is placed between said catenary (10) and said electrical switchgear (14).

3. A vehicle according to claim 2, wherein said ferrite interference attenuator (16) is made up of a plurality of ferrite elements (44, 46, 44A, 46A) disposed around a conductor line (36) interconnecting said catenary (10) and said electrical switchgear (14).

4. A vehicle according to claim 3, wherein said ferrite elements are distributed axially in successive pairs (44, 46,

44A, 46A), each pair being made up of a high-frequency ferrite element (46, 46A) associated with a low-frequency ferrite element (44, 44A), said high-frequency ferrite element having a cutoff frequency that is higher than the cutoff frequency of said low-frequency ferrite element.

5. A vehicle according to claim 4, wherein the cutoff frequency of said high-frequency ferrite element (46, 46A) lies in the range 5 MHz to 20 MHz, while the cutoff frequency of said low-frequency ferrite element (44, 44A) lies in the range 0.5 MHz to 5 MHz.

6. A vehicle according to claim 4, wherein said ferrite interference attenuator comprises in the range two pairs of ferrite elements (44 & 46; 44A & 46A) to twenty pairs of ferrite elements.

7. A vehicle according to claim 4, wherein the two ferrite elements of each pair (44 & 46; 44A & 46A) are annular and fit into each other, said high-frequency ferrite element (46, 46A) being disposed at the outside periphery of the low-frequency ferrite element (44, 44A).

\* \* \* \* \*